United States Patent [19]
McAdams et al.

[11] 3,876,879
[45] Apr. 8, 1975

[54] METHOD AND APPARATUS FOR DETERMINING SURFACE CHARACTERISTICS INCORPORATING A SCANNING ELECTRON MICROSCOPE

[75] Inventors: Hiramie T. McAdams, Williamsville; Edward A. Gasiecki, Depew, both of N.Y.

[73] Assignee: Calspan Corporation, Buffalo, N.Y.

[22] Filed: Nov. 9, 1973

[21] Appl. No.: 414,568

[52] U.S. Cl.................................. 250/307; 250/310
[51] Int. Cl...................... H01j 37/26; G01n 23/04
[58] Field of Search ........... 250/306, 307, 309, 310, 250/311

[56] References Cited
UNITED STATES PATENTS
3,549,999  12/1970  Norton............................... 250/310
3,597,607  8/1971  Campbell............................ 250/310

Primary Examiner—James W. Lawrence
Assistant Examiner—C. E. Church
Attorney, Agent, or Firm—Allen J. Jaffe

[57] ABSTRACT

Method and apparatus for determining surface characteristics such as elevations of points on a surface wherein; an electron beam scans the surface causing electrons to be emitted from the surface; an electron sensitive detector develops signals in response to the emitted electrons impinging thereupon; a shield is located above the surface for blocking electrons emitted from an area of the surface from reaching the detector, the boundary of the area comprising a line that is a function of the elevation or contour of points on the surface, which line is sensed by the detector as a locus of points on the surface wherein the output of the detector abruptly changes in value.

26 Claims, 4 Drawing Figures

METHOD AND APPARATUS FOR DETERMINING SURFACE CHARACTERISTICS INCORPORATING A SCANNING ELECTRON MICROSCOPE

BACKGROUND OF THE INVENTION

The present invention relates to the analysis of surface characteristics and, more particularly, to a method and apparatus for accurately determining the topography or relative elevations of points on surfaces.

There are presently known methods and structures for measuring and analyzing the surface profiles of various objects. These can generally be classified into two categories, namely, the contacting types and the noncontacting types.

The contacting type of device for measuring surface finishes or profiles usually comprises the sensing of surface elevations by a stylus in contact with the surface to be measured. The disadvantages of this type of apparatus are the resolution limitations imposed by the radius of the stylus tip and the need to employ extremely light contacting pressures to prevent damage to the surface being measured.

The noncontacting devices usually consist of optical apparatus such as optical microscopes. These devices, although capable of detecting the profile of an object in a plane perpendicular to the optical axis, are not suited for quickly and accurately determining the complete three dimensional topography or contours of the surface of such object. Moreover when the dimensions of the elevation increments are smaller than the wavelength of light, optical measuring devices are incapable of detecting the same.

SUMMARY OF THE INVENTION

The foregoing disadvantages, as well as others, are overcome according to the teachings of the present invention which provides an improved method and apparatus for measuring the complete surface topography of objects.

Generally, with either an optical microscope or an electron microscope the profile or contours of the edge of an object can be detected by placing such edge perpendicular to the axis of the irradiating beam. If it were possible to slice the object into many segments and look at the profile of the edges of each segment, then enough data could be obtained to define the complete topography or surface contours of the object. It is the purpose of the present invention to provide a method and apparatus whereby such data can be obtained without the necessity of contacting or destroying the object as would result if the object were sliced into a large number of sections.

The principles of the present invention are best illustrated by means of a scanning beam of electrons generated by a conventional scanning electron microscope, wherein a narrow beam of electrons impinges on the surface under investigation and as a result electrons emanate therefrom in substantially straight lines.

Basically, the present invention provides means providing an impinging beam of electrons on a surface, the topography of which is to be determined, detection means for detecting electrons emanating from the surface in response to said impinging beam, means providing relative motion between said impinging beam and the surface such that said impinging beam impinges upon various points on the surface producing at each point electrons emanating therefrom and shield means for preventing said emanating electrons from a portion of the points on the surface from reaching said detection means, whereby the output of said detection means is a function of the elevation of said portion of points.

BRIEF DESCRIPTION OF THE DRAWINGS

For a fuller understanding of the present invention reference should now be had to the following detailed description thereof taken in conjunction with the accompanying drawings wherein.

DESCRIPTION OF THE PREFERRED EMBODIMENTS

Figure 1:
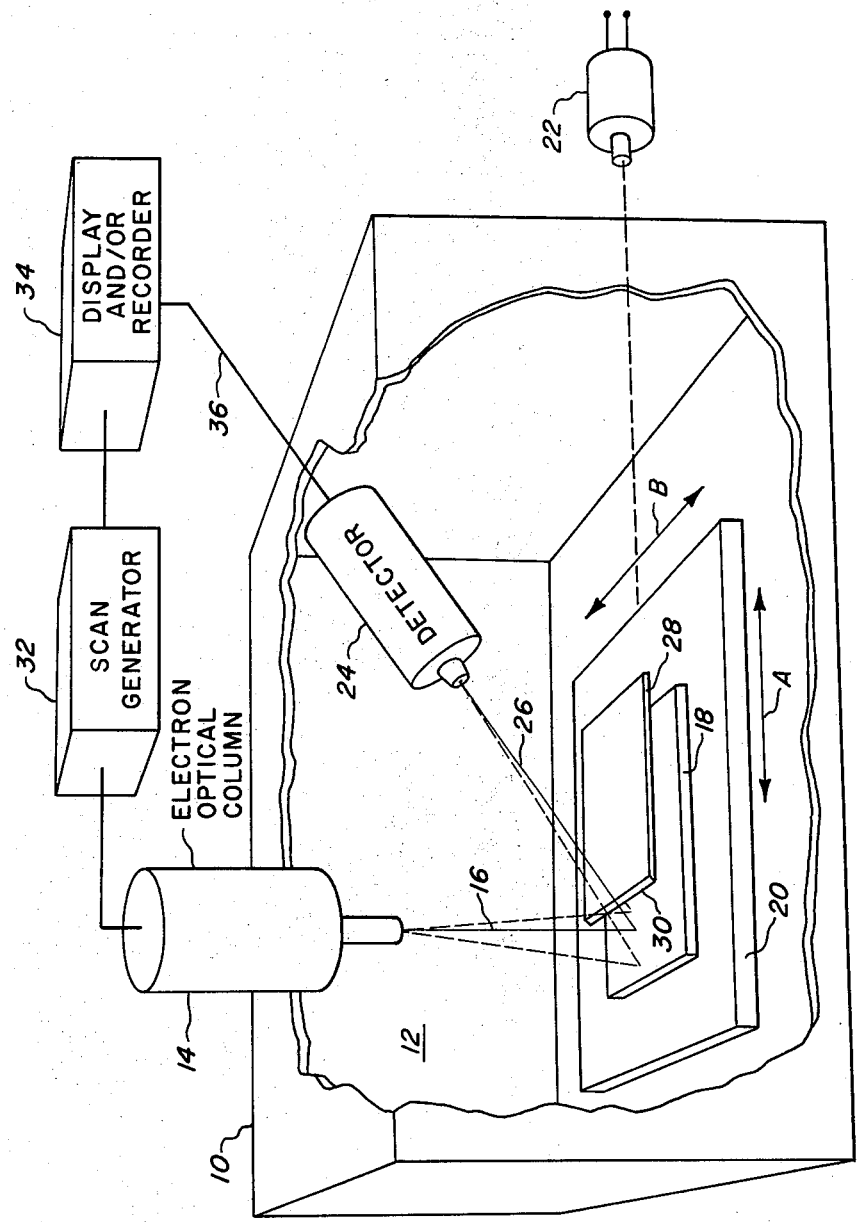
FIG. 1 is a schematic representation of the apparatus according to the present invention.
Figure 2:
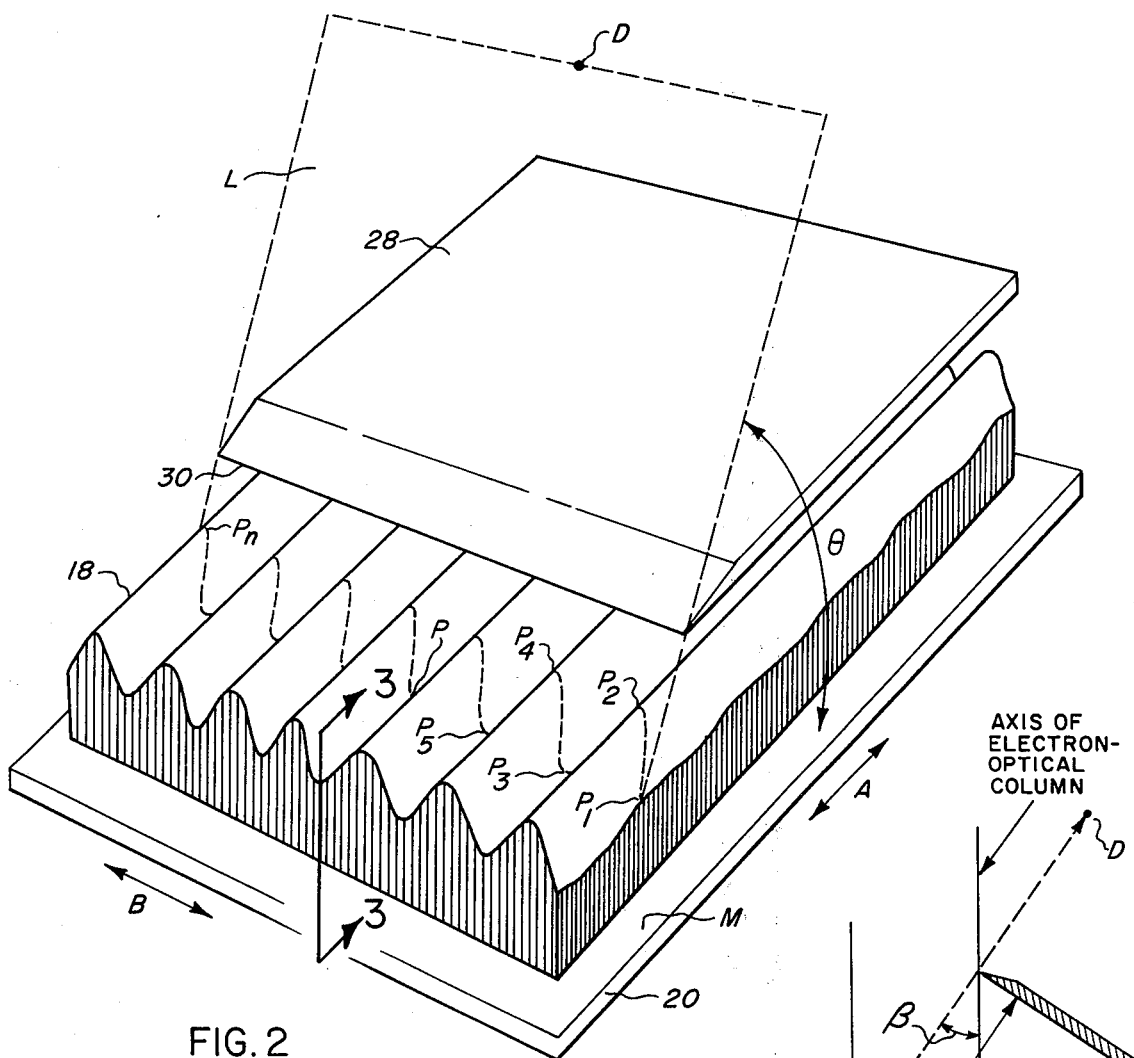
FIG. 2 is an enlarged pictorial fragmentary view of a portion of the apparatus illustrated in FIG. 1.

Referring now to the drawings and particularly to FIGS. 1 and 2, a housing 10 defines an evacuated chamber 12 through which projects the electron-optical column 14 of a conventional scanning electron microscope, the deflection apparatus of which causes a narrow beam of electrons 16 to scan a specimen 18 under investigation. The specimen 18 is supported on a suitable platform or stage 20 which can be moved, among other desired degrees of freedom, linearly in the direction of arrow A by a suitable actuator such as motor 22.

A detector 24 is responsive to the electron beam 26 emitted or emanating from the specimen 18 in response to the impinging beam 16 which sweeps lines in the direction of arrow A and indexes in the direction of arrow B. Alternatively lines can be swept in the direction of arrow B. It is significant that only those electrons emitted from specimen 18 which travel linearly or in straight lines be detected. To this end, detector 24 preferably comprises a backscattered electron collector or an unbiased secondary emission collector. Moreover the electron sensitive area of this detector should be as small as possible and preferably approaching a point.

Located between the specimen 18 and the detector 24 is a shield means 28 suitably adjustably supported by housing 10 and adjustably movable with respect to specimen 18, said shield means terminating in an edge 30 at the operative end thereof.

As is conventional, the electron-optical column is under the control of a scan generator 32 which synchronizes the motion of the electron beam with a display and/or recorder 34 which responds to a suitably amplified signal from detector 24 via line 36. The display can comprise a cathode ray tube as is well known.

As is best illustrated in FIG. 2 the surface of specimen 18 may have an irregular cross-sectional contour or profile of peaks and valleys which contour may be different in different planes. For simplicity and ease in presentation the profile is illustrated as grooves having equal peaks and valleys, the difference in elevations of which, the apparatus of the present invention functions to efficiently and accurately detect. The electron sensitive area of detector 24 is depicted by point D. A plane L containing this point and edge 30 makes a known angle $\theta$ with the plane M forming the surface of platform 20. Plane L intersects the specimen surface in a plurality of points $P_1, P_2, P_3 \ldots P_n$, the elevations of which are to be determined with respect to a datum plane M or, equivalently, with respect to a plane parallel thereto and containing edge 30.

Figure 3:
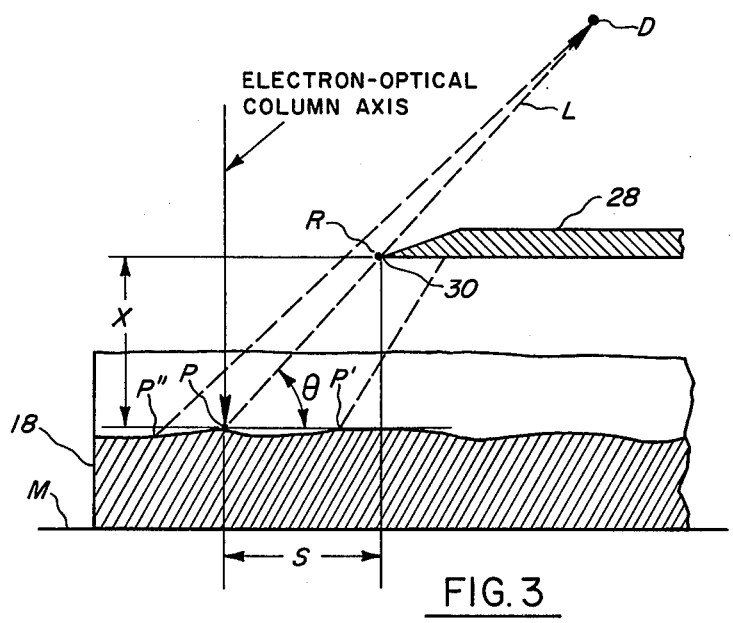
FIG. 3 is a sectional view taken along line 3—3 of FIG. 2.

As will be evident from FIG. 3, a line in the plane L originating in a point P in the specimen surface and terminating at the detector D is intersected by the edge 30 at a point R. The distance from point P to point R is a function of the elevation X of the point P relative to the plane which contains edge 30 and is parallel to the plane M, said distance fixing a distance S measured in the direction of the arrow A. Electrons emanating in straight lines from areas of the specimen surface containing points such as P' to the right of point P as viewed in FIG. 3 and below plane L will be blocked from reaching the sensitive area D of the detector and, therefore, will be incapable of generating an output signal therefrom to display 34. However, electrons emanating from areas of the specimen surface points such as P'' to the left of point P and above plane L will reach the sensitive area D and will generate signals for display 34. Thus, as the electron beam scans the specimen surface in the direction of arrow A and indexes thereacross in the direction of arrow B causing electrons to be emitted therefrom in straight lines, detectable signals will be generated from detector 24 from all portions of the specimen except for those in the area containing points P'. In this manner the boundary of such areas and the location of points $P_1, P_2, P_3 \ldots P_n$ can be recorded and displayed as those which cause the output of the detector to abruptly change in value or magnitude. With a record of the location of these points the elevations thereof can be easily calculated by means of the following relationship:

$$X = S \tan \theta$$

where:

X is the elevation of a point P on the surface, as measured from the plane which contains edge 30 and is parallel to plane M.

S is the distance in the direction of arrow A from point P to a plane containing edge 30 and perpendicular to plane M.

$\theta$ is as defined hereinabove.

These calculations can be automatically accomplished by means of suitable analog or digital computers, as is well known.

To establish the profiles or elevations in different regions of the surface 18, electrons emitted from different areas thereof must be blocked from reaching the detector 24. To this end, the surface can be moved or indexed relative to the edge 30 and the detector 18 permitting the determination of the boundaries of additional surfaces areas. This can be repeated as desired to determine the complete topography or elevations of all points on the surface.

Figure 4:
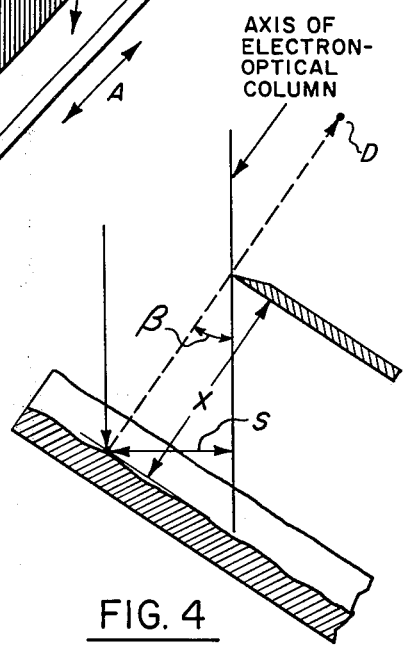
FIG. 4 is a view similar to FIG. 3 illustrating a different angular arrangement of the elements.

Although the support 20 and shield means 28 have been depicted in parallel planes substantially perpendicular to the axis of the electronoptical column wherein $\theta$ is an acute angle less than 90° other angular arrangements are contemplated. In fact, it has been determined that a preferred orientation would be where $\theta$ equals 90°. To this end, the support and shield means could be suitably rotated with respect to the axis of the electron optical column, as depicted schematically in FIG. 4. In this case the elevation X is given by:

$$X = S/\sin \beta$$

where:

$\beta$ is the angle between the axis of the electron optical column and the plane containing the shield means edge and the sensitive area of the detector.

While preferred embodiments of the present invention have been described, changes will obviously occur to those skilled in the art. For example, although shield means 28 has been disclosed as a planar element having a fine edge other forms are contemplated such as a positive field which blocks electrons from impinging on the detector by the capture thereof. This field, however, must not influence electrons which are in the sight of the detector.

It is therefore intended that the present invention be limited only by the scope of the appended claims.

We claim:

1. A method of enabling the determination of surface elevation, comprising the steps of:
    a. projecting a beam of electrons on a surface causing electrons to be emitted therefrom,
    b. detecting by means of a detector electrons emitted from the surface,
    c. blocking from being detected by blocking means electrons emitted from a first area of the surface, the relative positions of the detector and the blocking means being predetermined, and
    d. locating the boundary of said first area by detecting the location of points on the surface at which the output of the detector abruptly changes in value whereby the relative elevations of said points can be determined.

2. The method according to claim 1, further comprising the steps of:
    e. blocking from being detected electrons emitted from a second area of the surface, and
    f. locating the boundary of the second area by detecting the location of points on the surface at which the output of the detector abruptly changes in value.

3. The method according to claim 2, further comprising the steps of:
    g. blocking from being detected electrons emitted from a plurality of additional areas on the surface, and
    h. repetitively locating the boundaries of said additional areas by repetitively detecting the location of points on the surface for each additional area at which the output of the detector abruptly changes in value.

4. The method according to claim 3 wherein said step of blocking additional areas is accomplished by moving the surface.

5. The method according to claim 3 wherein said beam of electrons is caused to scan the surface.

6. The method according to claim 5 further comprising the step of:
    i. recording the output of the detector.

7. The method according to claim 5 further comprising the steps of:
    i. displaying the output of the detector on a display device, and
    j. synchronizing the display device with the scanning electron beam.

8. Apparatus for enabling the determination of surface elevation with respect to a datum plane, comprising:
   a. means for projecting a beam of electrons on a surface causing electrons to be emitted therefrom,
   b. detection means for detecting electrons emitted from the surface,
   c. means for blocking electrons emitted from a first area of the surface from being detected by said detection means, the relative positions of said detection means and said means for blocking being predetermined, and
   d. means for locating the boundary of said first area by detecting the location of points on the surface at which the output of said detection means abruptly changes in value whereby the relative elevations of said points can be determined.

9. The apparatus according to claim 8, wherein said blocking means comprises a shield spaced from the surface and located between the surface and said detection means.

10. The apparatus according to claim 9, wherein said shield has an edge and the boundary of the first area is a line which is defined by the intersection of the surface by a plane containing said edge and said detection means.

11. The apparatus according to claim 10, wherein said plane makes a predetermined angle with respect to the datum plane.

12. The apparatus according to claim 11, further comprising:
   e. means for blocking electrons from additional areas of the surface from being detected by said detection means.

13. The apparatus according to claim 12, wherein said last mentioned means comprises means for moving the surface with respect to said blocking means.

14. The apparatus according to claim 12, wherein said means for projecting a beam of electrons includes means for causing said beam to scan the surface.

15. The apparatus according to claim 14, further comprising:
   f. a display device for displaying the output of said detection means, and
   g. means for synchronizing the display device with said scanning electron beam.

16. The apparatus according to claim 11 wherein said angle is substantially ninety degrees.

17. The apparatus according to claim 8, further comprising:
   e. means for recording the output of said detection means.

18. The apparatus according to claim 8, wherein said means for projecting a beam of electrons includes means for causing said beam to scan the surface.

19. The apparatus according to claim 18, further comprising:
   e. means for recording the output of said detection means.

20. The apparatus according to claim 18 further comprising:
   e. a display device for displaying the output of said detection means, and
   f. means for synchronizing the display device with said scanning electron beam.

21. The apparatus according to claim 8, wherein said blocking means is spaced from the surface and located between the surface and said detection means.

22. The apparatus according to claim 21, further comprising:
   e. an extremity of said blocking means,
   f. an electron sensitive portion of said detection means having an area approaching that of a point, and wherein the boundary of the first area is a line on the surface which is defined by the intersection of the surface by a plane containing said extremity and said electron sensitive portion.

23. The apparatus according to claim 22, further comprising:
   g. means for blocking electrons from additional areas of the surface from falling on said electron sensitive portion.

24. The apparatus according to claim 23, wherein said last mentioned means comprises means for moving the surface with respect to said blocking means.

25. The apparatus according to claim 8, wherein said detection means comprises a backscatter detector.

26. The apparatus according to claim 8, wherein said detector means comprises an unbiased secondary emission detector.

* * * * *